(12) United States Patent
Brown

(10) Patent No.: US 6,577,090 B2
(45) Date of Patent: Jun. 10, 2003

(54) DC VOLTAGE LEVEL SHIFTER

(75) Inventor: Fred A. Brown, Coronado, CA (US)

(73) Assignee: Comair Rotron, Inc., San Diego, CA (US)

( * ) Notice: Subject to any disclaimer, the term of this patent is extended or adjusted under 35 U.S.C. 154(b) by 0 days.

(21) Appl. No.: 09/931,502

(22) Filed: Aug. 16, 2001

(65) Prior Publication Data

US 2002/0021100 A1 Feb. 21, 2002

Related U.S. Application Data

(60) Provisional application No. 60/226,352, filed on Aug. 18, 2000.

(51) Int. Cl.[7] ................................. H02P 7/00
(52) U.S. Cl. ................. 318/434; 318/800; 363/132
(58) Field of Search .................. 318/138, 254, 318/434, 439, 727, 798, 801, 802, 800; 363/16, 35, 37, 41, 98, 132

(56) References Cited

U.S. PATENT DOCUMENTS 4,603,288 A * 7/1986 Rogers .................. 363/84
4,860,185 A * 8/1989 Brewer et al. ........... 363/41

* cited by examiner

*Primary Examiner*—Khanh Dang
(74) *Attorney, Agent, or Firm*—Bromberg & Sunstein LLP

(57) ABSTRACT

An apparatus for producing a floating DC voltage source from an electric motor which may be a brushless DC motor. The apparatus includes a rectifier circuit for rectifying back electromotive force voltage from a winding of the motor and a clamping circuit for clamping the rectified voltage to produce a floating DC voltage which may be a TTL logic level voltage. A motor control circuit is disconnected from the winding to produce the back electromotive force voltage.

19 Claims, 5 Drawing Sheets

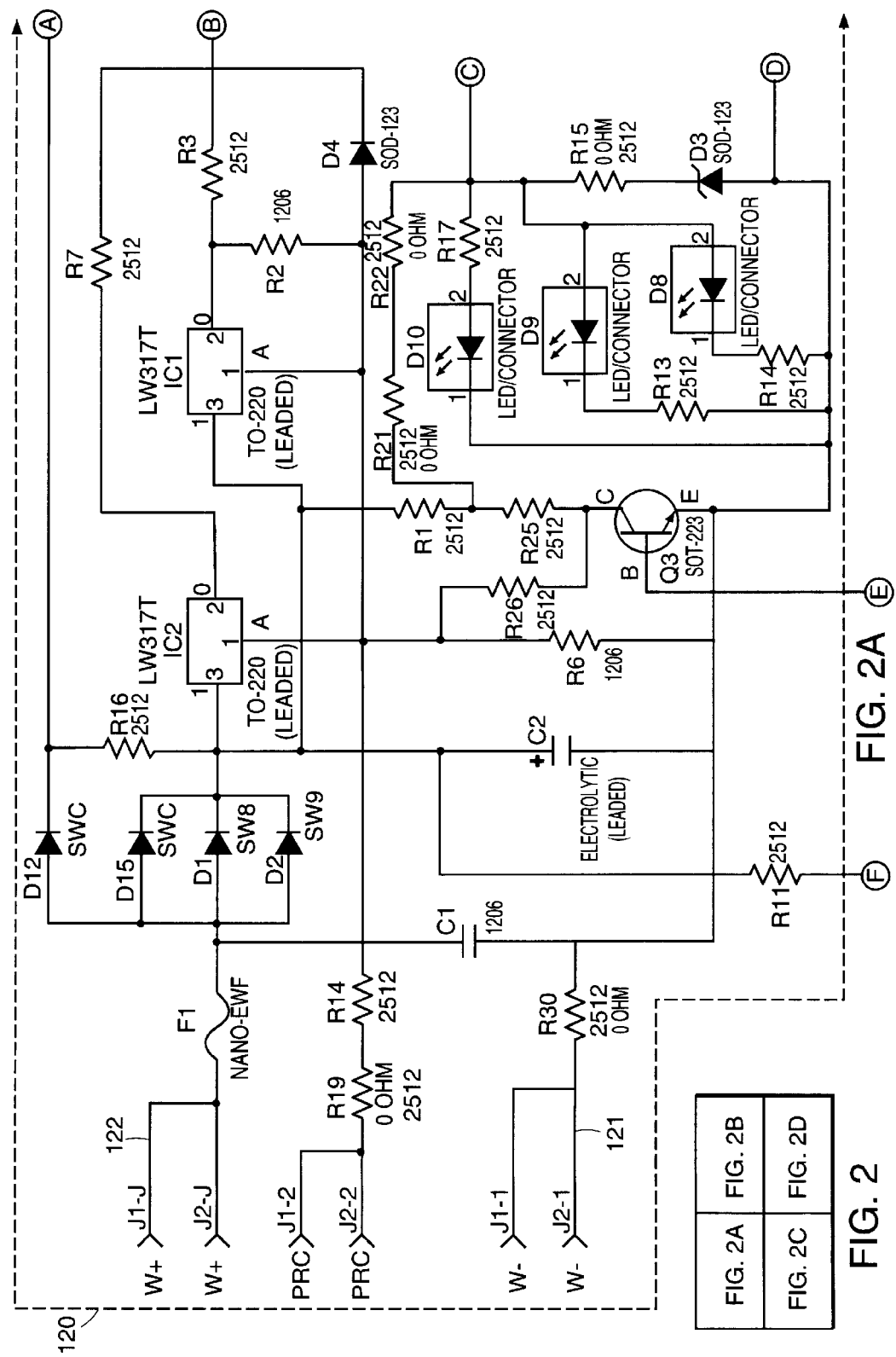

DC VOLTAGE LEVEL SHIFTER

PRIORITY

The present application claims priority from U.S. provisional application No. 60/226,352, filed Aug. 18, 2000 and incorporated herein by reference.

TECHNICAL FIELD

The present invention relates to voltage level shifting, and, more particularly, to using DC motors to shift the level of DC reference voltages.

BACKGROUND ART

For integration into electronic systems, electronic devices accept available ground references for DC power supply voltages. In some instances, the electronic device may require a DC voltage which is different than the electronic system into which it is being integrated, resulting in incompatible ground references. For example, the electronic device may require a 5V TTL logic level while the electronic system may output −48V (having a 48V reference to ground). Typically, DC-to-DC converters are used to shift the voltages of the system so that the voltages and the ground references correspond with the specifications for the electronic device. DC-to-DC converters, however, require valuable space and are very expensive.

SUMMARY OF THE INVENTION

In accordance with one aspect of the present invention, an apparatus is provided for producing a floating DC voltage source from an electric motor. The apparatus includes a rectifier for rectifying a back electromotive force voltage from a winding of the motor and a clamping circuit which clamps the rectified voltage to produce a floating DC voltage. Switching off the winding from a motor control circuit connected to the motor produces the back electromotive force voltage. The DC motor may be a DC brushless motor, the winding may be a stator winding, and the DC voltage may be a TTL logic level voltage.

In accordance with another aspect of the present invention, a method is provided for producing a floating DC voltage source from an electric motor. The method includes rectifying a back electromotive force voltage from a winding of the electric motor to produce a rectified voltage and clamping the rectified voltage to generate a floating DC voltage. Switching off the winding from a motor control circuit connected to the motor produces the back electromotive force voltage. The DC motor may be a DC brushless motor, the winding may be a stator winding, and the DC voltage may be a TTL logic level voltage.

BRIEF DESCRIPTION OF THE DRAWINGS

The foregoing features of the present invention will be more readily understood by reference to the following detailed description taken with the accompanying drawings, in which.

DETAILED DESCRIPTION OF SPECIFIC EMBODIMENTS

In preferred embodiment of the invention, a DC voltage level shifter uses electromotive force (EMF) pulses generated in a stator winding of a DC motor when the current through the winding is suddenly interrupted to generate a DC voltage referenced to a floatable voltage level (an "artificial ground"). As a result, even when the positive input to the DC motor is set at ground and the negative input to a negative voltage, a positive DC voltage can be referenced to the voltage at the high DC motor input. This is possible even though such a connection results in a DC voltage more positive than the DC voltage provided to the DC motor.

Figure 1:
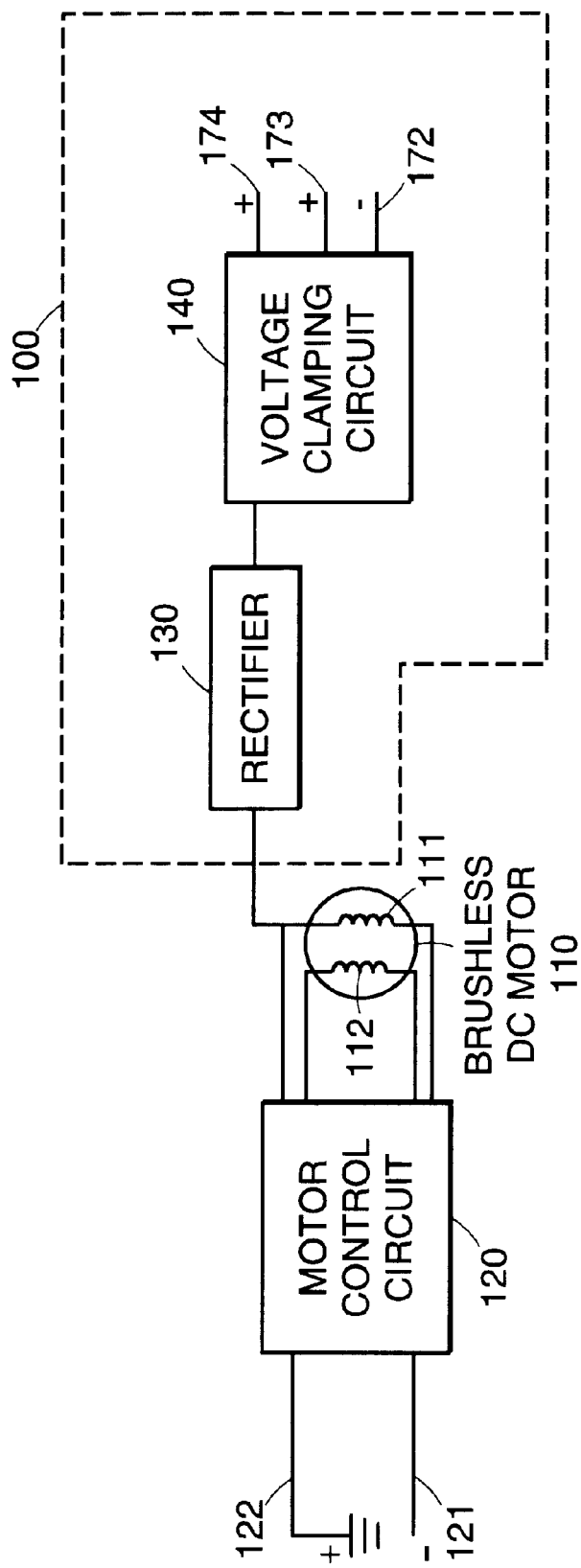
FIG. 1 is a block diagram showing a DC motor coupled to a voltage level shifter in accordance with a preferred embodiment of the invention.

FIG. 1 is a block diagram showing a brushless DC motor 110 in accordance with a preferred embodiment of the invention. DC motor 110 includes stator windings 111 and 112. DC motor 110 is coupled to DC level shifter 100 (via stator winding 111, 112, or both) and to motor control circuit 120. Motor control circuit 120 receives an input (negative) voltage at terminal 121, relative to a ground at terminal 122. Motor control circuit 120 alternately switches stator windings 111 and 112 on and off. When the stator windings are switched off they are in a de-energized state. In operation, a magnetic field rotates within the motor 110 at a frequency and a phase with respect to a rotor (not shown) to rotate the rotor at a desired rate with a required torque. As each stator winding (111, 112) is switched off, a back electromotive force (EMF) voltage is established at each winding. The back EMF generally prevents current passing through the stator windings. The magnitude of the back EMF voltage can exceed twice the magnitude of the voltages applied to the stator windings (in their de-energized state) by the motor control circuit 120. Of course, DC motor 110 is not limited to a brushless motor and may be, for example, any motor which develops back EMF voltage.

DC voltage level-shifter 100 includes a rectifier circuit 130 and a clamping circuit 140. Rectifier circuit 130 samples a back EMF voltage generated by a stator winding (111, 112) in each de-energized state and rectifies the back EMF voltage (i.e., passes through positive back EMF voltage to the voltage clamping circuit 140, but not negative back EMF voltage from motor control circuit 120). Clamping circuit 140 filters the rectified back EMF from the rectifier circuit 130 and establishes a substantially constant DC voltage at output terminal 173 or 174 that is smaller than the processed back EMF voltage. This substantially constant DC voltage is generated relative to the artificial ground 171. Motor control circuit 120, rectifier circuit 130 and clamping circuit 140 are discussed in further detail in the discussion of FIG. 2 below. Although in the preferred embodiment shown in FIG. 1, the DC voltage level-shifter 100 is connected to stator winding 111, the invention is not limited to such a connection. In various embodiments, DC voltage level-shifter 100 may be connected to either of the stator windings 111 and 112 or to both.

Figure 2B:
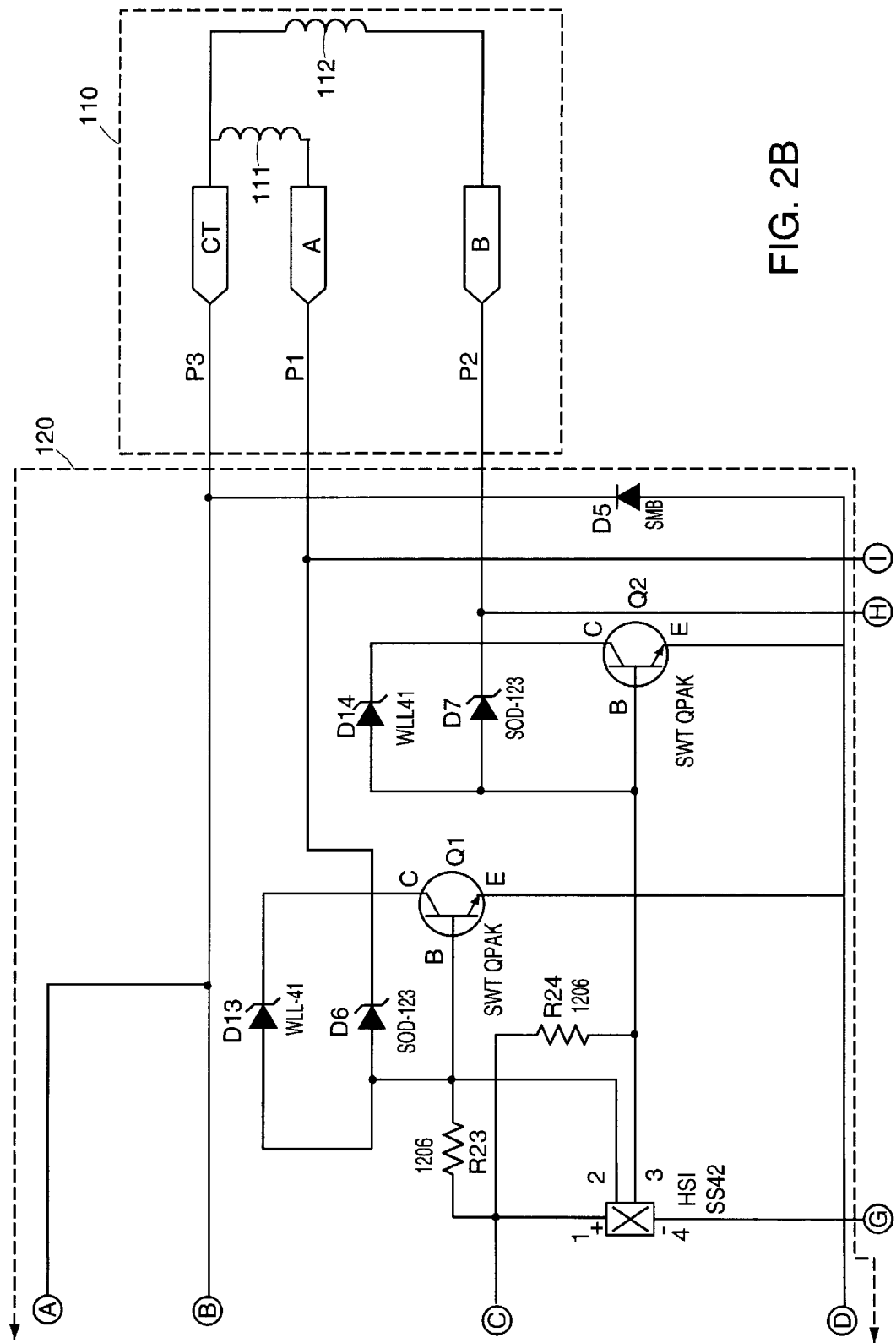
FIGS. 2 and 2(a–d) are schematic diagrams showing in detail the DC voltage level shifter of FIG. 1, an opto-isolator, and a fan sensor circuit for generating TTL voltage logic levels within a fan motor circuit in accordance with a specific embodiment of the invention.
Figure 2C:
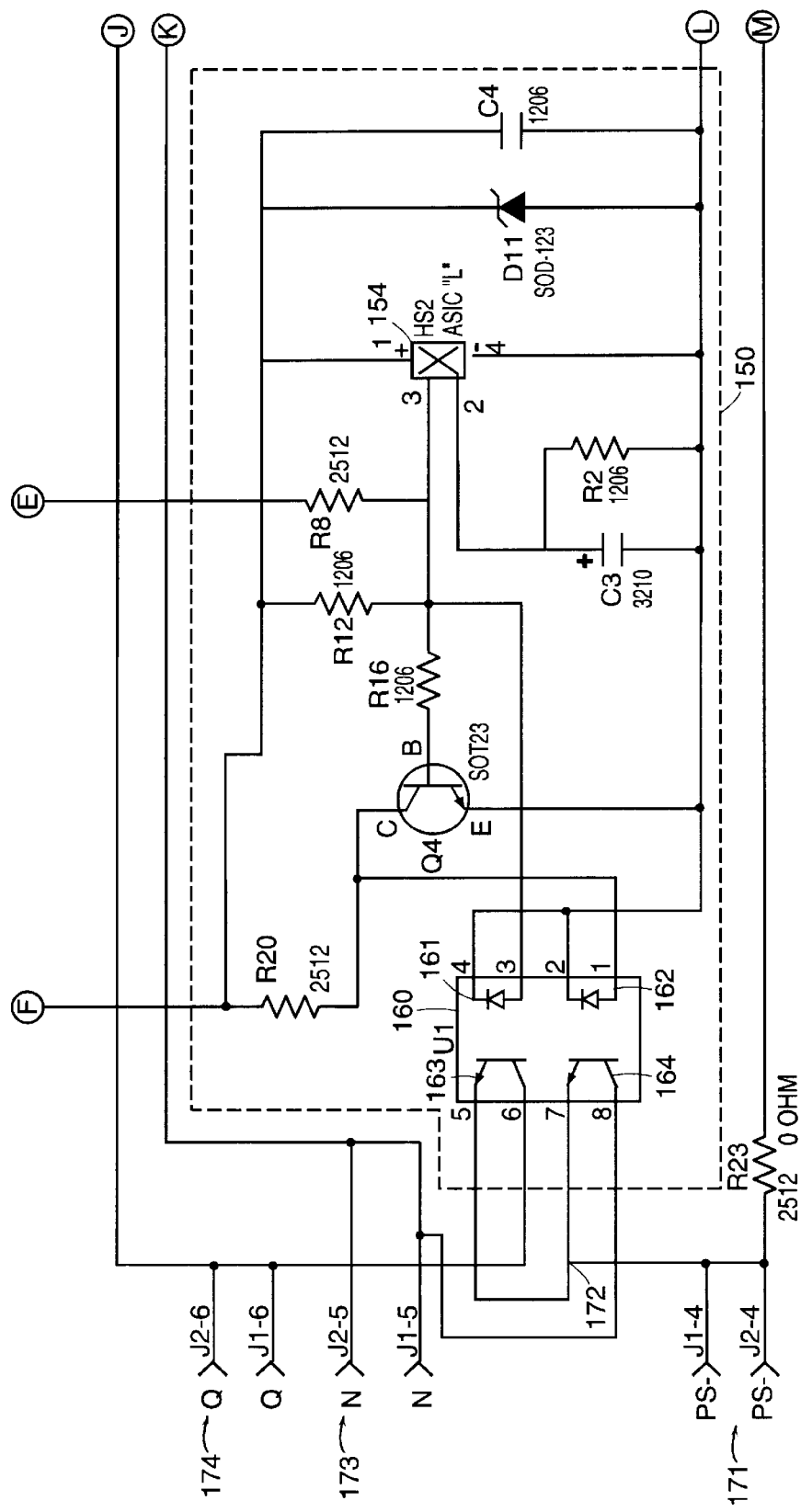
Figure 2D:
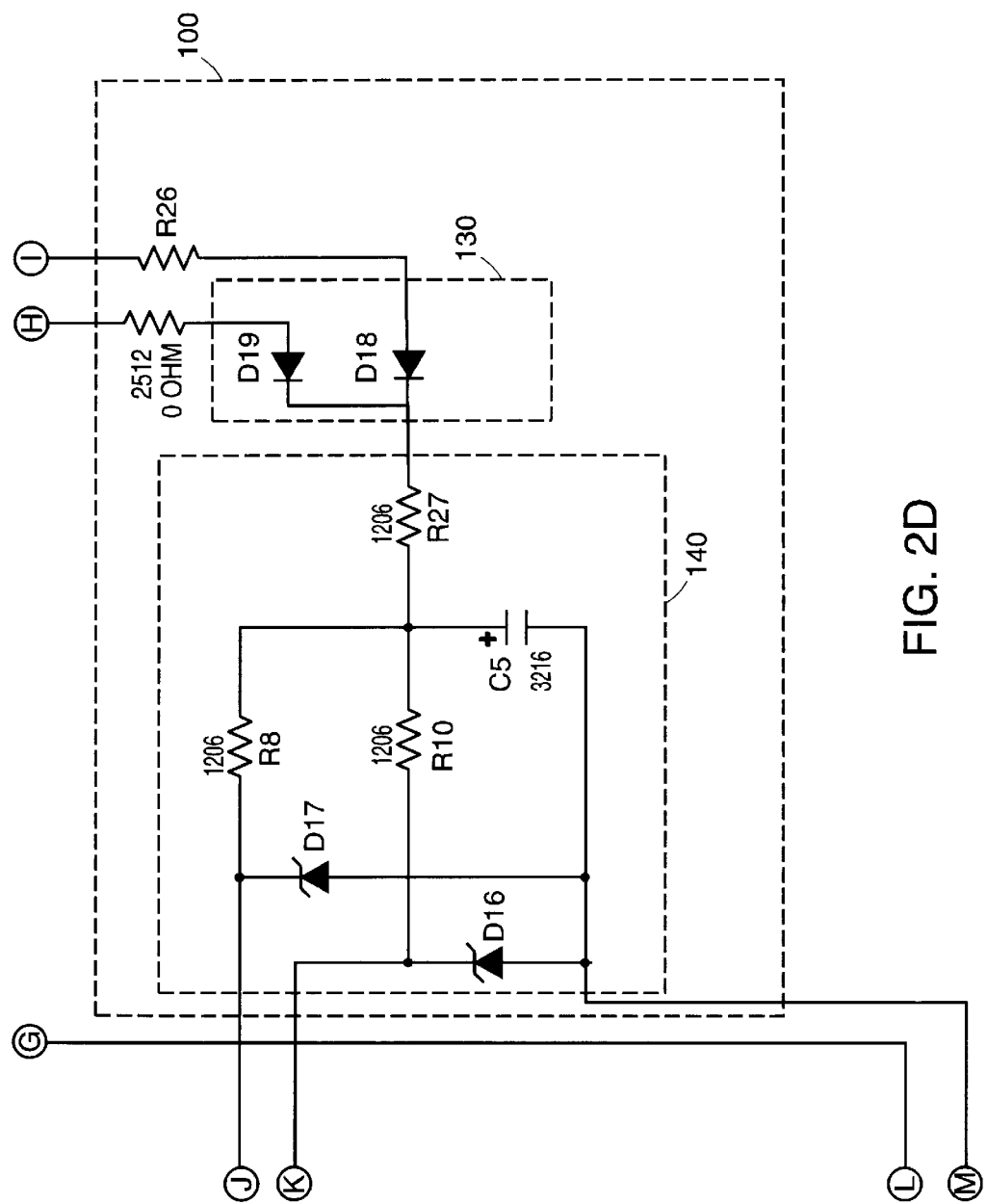

The motor control circuit 120, rectifier 130, and clamping circuit 140 (described above in FIG. 1) are shown in detail in the schematic diagram of FIG. 2. Motor control circuit 120 supplies voltages to stator windings 111 and 112 of the DC motor 110 and receives a relative positive input voltage M+ (actually ground) at input terminal 122 and a relative negative input voltage M− at input terminal 121. Transistors Q1 and Q2 in motor control circuit 120 selectively supply current to the stator windings 111 and 112. Rectifier circuit 130 includes diodes D18 and D19. Diode D18 connects stator winding 111 to resistor R27 of the clamping circuit 140 while diode D19 connects stator winding 112 to sampling resistor R27 of the clamping circuit 140. Diodes D18 and D19 tap the back EMF from the stator windings when they are switched off passes positive voltage and current across sampling resistor R27 in the clamping circuit 140. It is advantageous to connect both stator windings to the rectifier circuit so that when one stator winding is switched on (i.e., not establishing back EMF voltage), the rectifier can still pass voltage from the other stator winding to the clamping circuit 140. Sampling resistor R27, which is in series with capacitor C5, acts as a current limiter for the back EMF. It is necessary to limit the current from the back EMF to prevent excessive current levels from reaching the capacitor C5. Diode D15 charges capacitor C5 to a value which is approximately twice the level needed for the desired DC reference voltage. For example, if a 5V TTL voltage is required, the capacitor C5 may be charged to 12V. The value of sampling resistor R27 is chosen so that the resulting voltage drop from the back EMF voltage allows the capacitor C5 to be charged to the desired value. For example, if the desired value of capacitor C5 is 12V and the back EMF voltage is 96V, resistor R27 is chosen to have a voltage drop of 80V. Diode D16 clamps the voltage of capacitor C5 to establish the required 5V TTL voltage across resistor R10. Similarly, zener diode D17 clamps the voltage of capacitor C5 to establish the required 5V TTL logic level voltage across resistor R6.

In operation, sequentially switching off transistors Q1 and Q2 in the motor control circuit 120 interrupts current to the stator windings 111 and 112 respectively. As a result, positive back EMF voltages are established by the stator windings 111 and 112. These back EMF voltages appear, in combination with the input voltage previously applied at input terminal 121, at the collectors of transistors Q1 and Q2 which are connected to the stator windings 111 and 112 respectively. Zener diodes D6 and D7 or D13 and D14 protect the motor control circuit 120 from these back EMF voltages. Diodes D18 and D19 tap (sample) the back EMF from Q1 and Q2 and charge capacitor C5. Voltages across the zener diodes D16 and D17 increase until they reach breakdown voltage. D16 and D17 sustain this voltage as long as the capacitor C5 remains charged to a greater value than the required DC reference (TTL) voltage.

The schematic diagrams of FIGS. 2 and 2(a–d) also show the DC motor 110 and voltage level shifter 100 of FIG. 1 coupled to an opto-isolator 160 and a fan sensor circuit 150 for determining the status of a fan (not shown) powered by DC motor 110 in accordance with a specific embodiment of the invention. The fan may be of the type typically found in telecommunications equipment. The fan receives an input voltage at terminal 121 of the motor control circuit 120 which is negative with respect to the ground at terminal 122.

Opto-isolator includes photodiodes 161 and 162 and transistors (or switches) 163 and 164. The cathode of zener diode D17 is connected to the collector (pin 6) of transistor 163 of opto-isolator 160 and to the output terminal 174 of fan performance sensor 150. The cathode of zener diode D16 is connected to the collector (pin 8) of transistor 164 of opto-isolator 160 and to an inverted ("N") terminal 173 (which outputs a logic level that is opposite of output terminal 174) of fan sensor circuit 150. The anode (pin 3) of photodiode 161 in opto-isolator 160 is connected to the output (pin 3) of fan performance sensor 154. The anode (pin 1) of photodiode 162 in opto-isolator 160 is connected to the collector of transistor Q4 in fan performance sensor circuit 150. The emitters of transistors 162 and 163 are connected to each other and tied to the floating ground 171 at connection 172.

Fan sensor circuit 150 includes fan performance sensor 154 for determining fan status and transistor Q4. The collector of Q4 is connected to the anode (pin 1) of photodiode 162 in opto-isolator 160. The base of transistor Q4 is connected to the output (pin 3) of fan performance sensor 154. In this embodiment, fan performance sensor 154 is a Hall Effect Application Specific Integrated Circuit (ASIC). The output (pin 3) of fan performance sensor 154, in addition to being connected to the base of Q4 is also connected to the anode (pin 3) of photodiode 161 of opto-isoloator 161. The sensor 154 outputs a TTL voltage based on fan performance. In this embodiment, the sensor 154 is set to "L" (Low) meaning that the fan sensor circuit 150 will output a low voltage (e.g., 0V) to indicate that the fan is operating properly (i.e., a pass condition) and a high voltage (e.g., 5V) to indicate that the fan is not operating properly (i.e., a fail condition) at output terminal 174. The anodes of zener diodes D16 and D17 are connected to the floating ground output 171 of the fan performance sensor 150. Fan sensor circuit 150 has the same supply voltage and ground, corresponding to input terminals 121 and 122, as has the motor control circuit 120. Floating ground output 171 may be connected to either of the input terminals 121 or 122 of motor control circuit 120.

When the fan is operating properly (i.e., pass condition), the output (pin 3) the output of fan sensor 154 will be low and no current will flow into photodiode 161 in opto-isolator 160. As a result, photodiode 161 biases adjacent transistor 163 off, no photons flow into the base of transistor 163 and the transistor appears as an open switch. The output voltage at terminal 174 will be high (e.g., 5V) because the voltage at the collector (pin 6) of transistor 163 is equal to the TTL voltage across the resistor R6 (which is clamped by the zener diode D17). Additionally, when the fan is operating properly no current will flow into the base of transistor Q4 which is also connected to fan sensor 154. As a result, transistor Q4 is biased off and current from the collector of transistor Q4 (which is in series with logic resistor R20) will flow through photodiode 162. As a result, photodiode 162 produces photons which bias transistor 164 on, the transistor 164 appears as a closed switch, and the voltage at the collector (pin 8) is approximately zero. Thus, the output voltage at inverted "N" terminal 173 will be low (i.e., approximately 0V) relative to the floating ground 171.

Thus, the fan sensor circuit 150 provides two logic levels indicative of fan performance. If a high logic level is desired to indicate a pass condition for the fan, output 174 may be used. Conversely, if a low logic level is desired to indicate a pass condition, output 173 may be used. If the fan had the opposite condition (i.e., was not operating properly), opposite logic levels would be output from terminals 173 and 174. Of course, the invention is not limited to determining the status of the aforementioned fan and can be applied to any electronic device requiring TTL logic levels.

Because of the electrical isolation provided by the opto-isolator 160, the floating ground terminal 171 can be connected to motor control circuit ground at terminal 122. As a result, the voltage clamping circuit 140 can supply DC voltage at output terminal 173 or 174 that is positive with respect to the artificial ground at terminal 171 and exceeds the negative input voltage in the motor control circuit 120. Since artificial ground 171 can be connected to the motor control circuit ground at port 122, the output voltage at terminal 173 or 174 can swing from ground to a zener voltage above ground, hence, more positive than any voltage in the motor control circuit 120.

Although various exemplary embodiments of the invention have been disclosed, it should be apparent to those skilled in the art that various changes and modifications can be made which will achieve some of the advantages of the invention without departing from the true scope of the invention. These and other obvious modifications are intended to be covered by the appended claims.

What is claimed is:

1. An apparatus for producing a floating DC voltage from at least one winding of an electric motor, the apparatus comprising:

a plurality of nodes capable of being coupled with external potentials, a potential difference existing between any two of the plurality of nodes when coupled to the external potentials;

a rectifier connected to the at least one winding for producing a rectified voltage from back electromotive force voltage produced by the winding; and a voltage clamping circuit connected to the rectifier for clamping the rectified voltage, the voltage clamping circuit being couplable to any one of the plurality of nodes to produce the floating DC voltage.

2. The apparatus of claim 1, wherein the motor is a DC brushless motor.

3. The apparatus of claim 1, wherein the rectified voltage is a constant DC voltage.

4. The apparatus of claim 1, wherein a motor control circuit is connected to the at least one winding for supplying voltage to the winding.

5. The apparatus of claim 4, wherein the motor control circuit is disconnected from the at least one winding to produce the back electromagnetic force voltage.

6. The apparatus of claim 1, wherein the at least one winding is a stator winding.

7. The apparatus of claim 1, wherein the floating DC voltage is a TTL logic level voltage.

8. The apparatus as defined by claim 1 further comprising a floating output port and a local ground port, the floating DC voltage being the potential difference between the output port and the local ground port.

9. The apparatus as defined by claim 8 wherein the local ground port is electrically isolated from the plurality of nodes when not coupled to one of the plurality of nodes.

10. The apparatus as defined by claim 1 wherein the motor includes a winding energization circuit for energizing the winding, further wherein the plurality of nodes includes a first ground node and a second ground node, the winding energization circuit using the first ground node as its ground node, the voltage clamping circuit using the second ground node as its ground node to produce the floating DC voltage.

11. A method for generating a floating DC voltage from a least one winding of an electric motor, the electric motor having a plurality of nodes, each node being coupled with an external potential, a potential difference existing between any two of the plurality of nodes, the method comprising:

rectifying a voltage from back electromotive force voltage produced by the winding; and clamping the rectified voltage, the clamping voltage being floated by clamping the rectified voltage relative to the voltage at any one of the plurality of nodes to produce the floating DC voltage.

12. The method of claim 11, wherein the at least one winding is disconnected from a motor control circuit to produce the back electromotive force voltage.

13. The method of claim 11, wherein clamping the rectified voltage includes clamping a constant DC voltage.

14. The method of claim 11, wherein the motor is a DC brushless motor.

15. The method of claim 11, wherein the at least one winding is a stator winding.

16. The apparatus of claim 11, wherein the floating DC voltage is a TTL logic level voltage.

17. The method as defined by claim 11 wherein the floating DC voltage is the potential difference between a output port and a local ground port.

18. The method as defined by claim 17 further comprising measuring the voltage at the output port relative to one of the plurality of nodes.

19. The method as defined by claim 17 further comprising electrically isolating the local ground port from the plurality of nodes prior to coupling the local ground port to one of the plurality of nodes.

* * * * *